United States Patent [19]

Shino et al.

[11] 4,194,587
[45] Mar. 25, 1980

[54] INDICATOR METERS FOR AUTOMOBILES AND ILLUMINATION THEREFOR

[75] Inventors: Makoto Shino, Wako; Sadao Makiguchi, Tokyo; Hajime Matsumoto, Kawasaki; Katsusuke Komuro, Chofu; Kazuhiro Iwai, Hidaka; Yoshikazu Tsuchiya, Kawagoe, all of Japan

[73] Assignee: Honda Giken Kogyo Kabushiki Kaisha, Tokyo, Japan

[21] Appl. No.: 930,556

[22] Filed: Aug. 3, 1978

[30] Foreign Application Priority Data

Aug. 5, 1977 [JP] Japan .................................. 52-105639

[51] Int. Cl.² .............................................. B60K 20/08
[52] U.S. Cl. ...................................... 180/90; 116/62.4
[58] Field of Search .............................. 180/90; 296/1; 116/62.3, 62.4, 31, 28.1

[56] References Cited

U.S. PATENT DOCUMENTS

| | | | |
|---|---|---|---|
| 2,723,642 | 11/1955 | Manning | 116/62.4 |
| 2,798,454 | 7/1957 | Gleeson | 116/28.1 |
| 2,879,940 | 3/1959 | Cornell | 116/62.4 |
| 2,912,059 | 11/1959 | Walker | 180/90 |
| 3,027,961 | 4/1962 | Rogant | 180/90 |
| 3,053,337 | 9/1962 | Prohaska | 180/90 |

Primary Examiner—Joseph F. Peters, Jr.
Assistant Examiner—John A. Carroll
Attorney, Agent, or Firm—Polster, Polster and Lucchesi

[57] ABSTRACT

An arrangement for indicator meters for automobiles, in which a speed meter and a tachometer are coaxially arranged in a front-and-back positional relationship in the lengthwise direction of the vehicle body so that they may be more readily observed with the least movement of eyes as well as from one and same direction. Also disclosed is an arrangement for the warning indicator devices, in which such warning indicators as turning directions, operating conditions of brakes, dynamo, and so forth are arranged in vacant space around dial plates for the speed meter and tachometer, and such warning indicator devices are accommodated in a cavity formed on the top raised portion of a steering handle column cover. Further, disclosed is an arrangement of a lamp to illuminate the dial plates and the indicator needles of the speed meter and the tachometer, in which the illuminating lamp is fixedly provided at a position in front of the dial plates so as to directly illuminate the dial plates and the indicator needles, and the lamp thus fitted is covered with the top raised portion of the steering handle column cover.

6 Claims, 5 Drawing Figures

INDICATOR METERS FOR AUTOMOBILES AND ILLUMINATION THEREFOR

BACKGROUND OF THE INVENTION

This invention relates to indicator meters for automobiles, and, more particularly, it is concerned with an arrangement of a speed meter, a tachometer, and so on to be installed in the instrument panel in the front section of the driver's seat, with an arrangement of warning indicator devices, as well as with illumination of such meters in the instrument panel.

Conventional automobiles have those speed meter, tachometer, and so on arranged sidewise in the instrument panel in front of the driver's seat in the vehicle cabin. Such sidewise arrangement, however, often causes inconveniences in verifying exact relationship between the speed, at which the vehicle is running, and revolution of the engine in that the driver has to move his eyes very quickly between left and right to compare the cruising speed with the engine revolution through these meters, while the vehicle is running at a high speed. This may lead to a very dangerous accident in driving. In addition, such sidewise arrangement would require a plurality of illuminating devices for each of these meters which inevitably make the electrical wiring in the instrument panel complicated.

If therefore these meters and warning indicator devices are concentrated at the center section close to the steering handle, and these meters can be arranged coaxially in the front-and-back positional relationship, they will become more conveniently verifiable and readable from one and same direction with the least movement of the driver's eyes. In addition, with such coaxial arrangement of the meters, its will be sufficient to provide a single illuminating lamp for lighting these meters.

SUMMARY OF THE INVENTION

In view of the above, it is the primary object of the present invention to provide indicator meters for an automobile, in which a speed meter and a tachometer are arranged in the front-and-back positional relationship in a readily recognizable and readable manner from one and same direction, and in which at least the meter disposed to the side near the driver (front side) may be driven by a belt or a gear through a driving shaft interlocked with a drive power source.

It is a secondary object of the present invention to provide an accommodating section for warning indicator devices at one place on the top raised portion of the upper steering column cover with a viewing window being provided to the side of the steering handle.

It is a third object of the present invention to provide indicator meters for an automobile, in which a lamp to directly illuminate the dial plates and the indicator needles is provided in front of the dial plates and indicator needles of the meters, and the rear side of the lamp is shielded by a steering column cover with a raised portion at its rear end portion near the lamp.

It is a fourth object of the present invention to provide a method for accommodating the warning indicator devices in a cavity at a top raised portion of an upper steering handle column cover.

According to the present invention, in one aspect thereof, there is provided indicator meters for automobiles comprising in combination: a first meter and a second meter arranged coaxially in the longitudinal direction of the steering handle column to enable the meters to be verified and read in one and same direction, at least one of the meters close to the driver's seat being driven by a drive shaft which is associated with a driving source through a power transmission belt or a gear.

According to the present invention, in another aspect thereof, there is provided an arrangement of warning indicator devices for automobiles which comprises arranging various warning indicators such as for tuning directions, operating conditions of brakes, dynamo, and so on arround a certain vacant space on a dial plate for a speed meter or a tachometer as coaxially arranged in the longitudinal direction of the vehicle body.

According to the present invention, in still another aspect thereof, there is provided a method for illuminating dial plates and indicator needles for speed meter, etc. for automobile which comprises providing a lamp for directly illuminating the dial plates and indicator needles at the front side of the meters, and shielding the illuminating lamp from the back side thereof.

There has thus been outlined rather broadly the more important features of the present invention in order that the detailed description thereof that follows may be better understood, and in order tha the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent construction so far as they do not depart from the spirit and scope of the present invention.

BRIEF DESCRIPTION OF THE ACCOMPANYING DRAWINGS

Specific embodiments of the present invention have been chosen for the purpose of illustration and description, and are shown in the accompanying drawing, forming a part of the specification, in which.

Figure 3A:
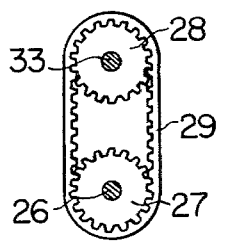
Figure 3B:
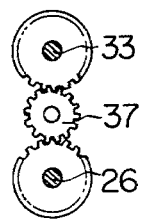
Figure 4:
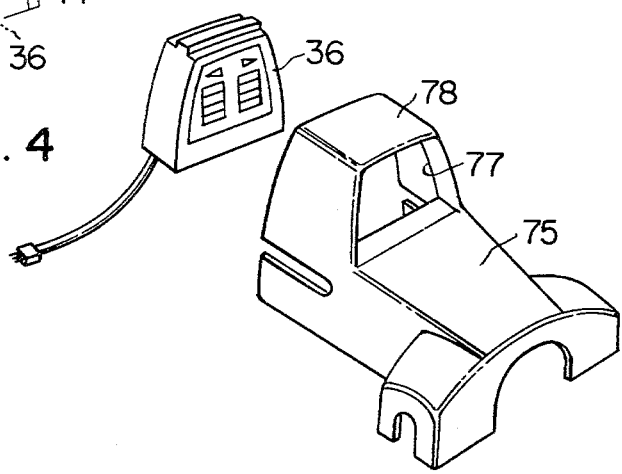

FIGS. 3(A) and 3(B) respectively show embodiments of the power transmission sectipn for the meters; and FIG. 4 is a perspective view of the top column cover for the stearing shaft and the warning lamp.

DETAILED DESCRIPTION OF PREFERRED EMBODIMENTS

Figure 1:
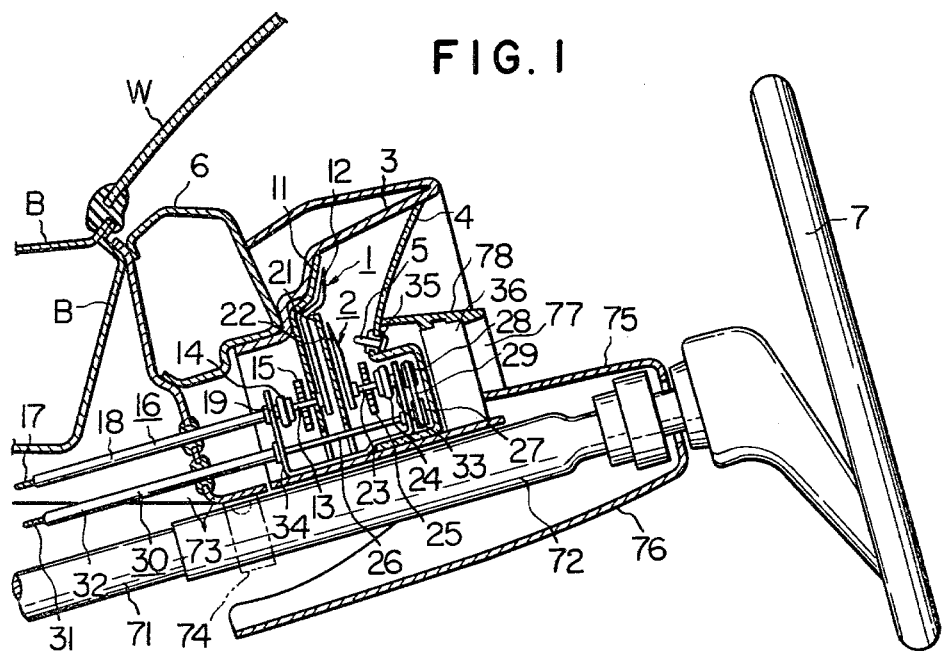
FIG. 1 is a side elevational view partly in longitudinal cross-section showing a preferred embodiment of the present invention.

Referring first to FIG. 1, a speed meter 1 and a tachometer 2 are disposed at a position just in front of, for example, a steering handle 7 of an instrument panel 6 with both being arranged coaxially in a front-and-back positional relationship. Reference numerals 11 through 15 respectively designate a dial plate, an indicator needle, an indicator needle shaft, an indicator needle shaft rotating mechanism, and a hair spring, all of which construct the speed meter 1. A reference numeral 16 designates a flexible wire (consisting of a inner wire 17 and an outer tube 18), and rotation of the inner wire 17 causes the indicator needle 12 to move angularly for its rotational angle against force of the hair spring 15 to indicate the current running speed of the automobile.

Reference numerals 21 through 25 inclusive respectively designate a dial plate for the tachometer 2, an indicator needle, an indicator needle shaft, an indicator needle shaft rotating mechanism, and a hair spring. A reference numeral 26 designates a rotational shaft disposed below the indicator needle shaft 23 in parallel therewith. Numerals 27 and 28 refer to pulleys, each being integrally provided with the abovementioned driving shaft 26 and an input shaft 33 of the indicator needle rotating mechanism 24. The indicator needle (pointer) rotating mechanism 24 is conventional, of the common magnetic coupling type, for example. A reference numeral 29 designates a belt extended between the pulleys 27 and 28. A reference numeral 30 denotes a flexible wire (consisting of an inner wire 31 and an outer tube 32) connected to the driving shaft 26, the inner wire 31 rotating in association with revolution of the engine. In this consequence, revolution of the engine is transmitted to the indicator needle rotating mechanism 24 en route the wire 31→the driving shaft 26→the pulley 27→the belt 29→the pulley 28, whereby the angular indicator needle 22 rotates against force of the hair spring 25 in accordance with the number of revolution of the engine, and the current number of engine revolution is indicated on the tachometer 2. It is to be noted that the pointer rotating mechanism 24 is positioned between the pulley 28 that is driven by the pulley 27, and the pointer 22, as distinguished from an arrangement in which a coupling is positioned between the drive shaft and gears or other power transmitting means that in turn are directly coupled to the pointer. A reference numeral 34 designates an angled bearing frame in a substantial shape of a letter "U" to support the driving shaft 26 on it.

The belt 29 for use may be of any shape such as a V-belt, a flat belt, a round belt, and various others. From the point of view that no slipping is caused when stretching or elongation occurs in the belt due to temperature increase, that accurate rotation can always be transmitted, and that no abnormal sound is created, use of a timing belt provided on its inner surface with a toothed section to be meshed with the pulleys, as shown in FIG. 3(A), is recommended. It is also feasible that, in place of the belt, a gear idler 37, as shown in FIG. 3(B), may be interposed between the pulleys.

A numeral 3 refers to a meter case; a numeral 4 refers to a cover glass (which is usually a transparent plastic plate) for the meters; 5 indicates a meter illuminating lamp; 71 refers to a steering shaft; 72 is a steering column; 73 denotes a steering hanger integral with the vehicle body B; 74 denotes a steering bracket; 75 desingates an upper steering column cover; 76 refers to a lower steering column cover; and W designates a wind shield glass.

As has been stated in the foregoing, since the present invention arranges nboth speed meter 1 and tachometer 2 in the front-and-back positional relationship in a coaxial manner so that they may be quickly readable from one and same direction with the least movement of the eyes. As the consequence, the driver needs not move his eyes toward left and right as in the case of the conventional meter arrangement where the individual meters are arranged sidewise in the instrument panel, but both meters 1 and 2 can be read and verified simultaneously at a glance, whereby reading time for the meters can be shortened, and the time thus saved can be used for safety measures in driving such as finding of any obstacle, etc. existing on its forwarding way.

Furthermore, since the rate of occupation by various meters in the instrument panel is reduced due to such arrangement, the layout of the instrument panel as a whole can be made simple, and the vacant portion in the instrument panel can be appropriated for the other functional purposes such as air duct installation, and so forth.

In addition, since the meters according to the present invention are so designed that the driving force may be transmitted to at least the meter 2 which is at the side close to the driver's seat from the driving shaft 26 associated with the drive power source through the belt 29 or the gear 37, as the drive power transmission means, accurate power transmission can be effected without any forced operation being done in transmitting the rotational force of the engine in comparison with a case, wherein, for example, the tip end part of the flexible wire 30 is folded to be connected with the indicator needle shaft rotating mechanism 24 of the meter 2. At the same time, the disadvantage of the wire being protruded forward of the meter owing to its folding can be eliminated and the meter as a whole can be arranged in a very simple and compact style, which is therefore highly suited as the space-saving meter arrangement for automobiles.

Figure 2:
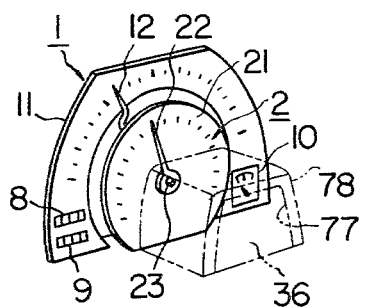
FIG. 2 is a perspective view of dial plates as coaxially arranged in accordance with the present invention.

Moreover, the power transmission to the rear side meter 1, which is at a position slightly distant from the driver's seat, can also be done from the flexible wire 16 through the belt or gear in the same manner as in the case of the front side meter 2. Also, as shown in FIG. 2, further intensification of the indicator meters can be done, if other indicators such as an integrating indicator 8, a trip meter 9, a fuel gauge 10, and so on are incorporated in appropriate portions in the dial plate 11 of the speed meter 1 (or the dial plate 21 of the tachometer 2) for the required indications of various data.

Incidentally, the driving power transmission mechanism such as the belt 29 of the front side meter 2 as well as the back surface of the meter illuminating lamp 5 may preferably be shielded by forming a raised portion 78 at the top rear end surface of the upper steering column cover 75, as shown in FIG. 1.

As the further embodiment according to the present invention, direct observation and verification of the warning lamp are contemplated in the above-described instrument panel.

Heretofore the warning lamps to effect various kinds of warnings such as turning directions indication, operational conditions indication of brakes, dynamo, and so on, as well as hydraulic pressure condition, etc. have been incorporated integrally in a meter case, in which the speed meter, tachometer, etc. ar arranged. On account of this, the meter case should be removed at every time electric bulbs for the warning lamps are to be replaced.

In order to remove the meter case, it was necessary to loosen case fitting screws by inserting fingers from below the instrument panel, and to remove meter cables and wirings, which work is laborious and time-consuming.

With a view to eliminate such troublesome work, the present invention, as stated in the foregoing, projectively provides a warning lamp accommodating section 78 having a window 77 to the side of the steering handle 7 on one portion of the upper steering column cover 75, and, into this accomodating section, or cavity, the warning lamp 36 is placed so that it may be directly observed and verified through the window 77 as shown in FIG. 4.

The upper and lower steering colum covers 75 and 76 are only for enclosing a connecting portion of the steering handle 7 and the shaft 71 to ameriorate its outer appearance, so that they are fitted onto the steering column 72 in a manner to be simply detachable and attachable in general.

With the abovementioned construction of the warning lamp accommodating section, when the upper steering column cover 75 is removed, the warning lamp 36 can also be removed together to facilitate replacement of the electric bulb for the warning lamp 36, hence maintenance work becomes easy in comparison with removal of the entire meter case for the necessary replacement as in the conventional arrangement.

Moreover, since the warning lamp 36 is provided in the cavity of the raised section 78 of the upper steering column cover 75, shifting of the sight line can be minimized in observing the warning lamp 33. Also, as the warning lamp is close to the steering handle position or the driver's seat, recognition of the lamp indication is easy. Further, when the speed meter 1 and the tachometer 2 are coaxially assembled as already mentioned in the foregoing, the mechanical section of the meters can be effectively covered up with the warning 36.

Incidentally, when the abovementioned upper steering column cover 75 as a whole is made of a soft synthetic resin material, it can be simply fitted to its position by pushing the same against elasticity of the plastic cover, without use of stopper screws, hence it can be easily removed from the cover 75. Further, when a safety structure or device is provided, in which impact load to be imposed on the steering handle 7 at the time of vehicle collision is absorbed and buffered through forward shifting of the steering shaft 71 and the column 72 (so-called collapsible handle), such soft plastic material constituting the upper steering column cover 75 does not hinder such impact absorbing action.

As a still further embodiment according to the present invention, there is provided an illuminating system for the automobile meters. That is, a lamp 5 to directly illuminate the dial plates and indicator needles are provided at the front side of the meters, and the back side of the lamp 5 is shielded by the steering column cover 78.

In general, the illuminating system for the automobile meters has been such that the dial plate for the meter is made translucent or semi-transmissive to light, at the back side of which the lamp is provided (light transmission system), or illuminating light from the lamp provided at the back side of the dial plate is caused to leak from a gap between the surrounding section of the dial plate and the inner surface of the meter case so that the leaking light may be reflected toward the surface of the dial plate (indirect lighting system), or a combination of the abovementioned two systems (hybrid system).

Either of the abovementioned lighting systems, however, require use of an electric bulb having a large wattage or many members of such bulbs to effect sufficient illumination. Also, a light diffusion chamber for accommodating the lamp should be provided at the back side of the dial plate with the consequent enlargement of the meter case as a whole. Moreover, at the time of replacement of the bulb due to breaking down of the light emitting element in the bulb, and other causes, the meter should be entirely removed from the instrument panel, which is troublesome.

The illustrated embodiment according to the present invention is such that one or two perforations are formed in the bottom middle portion of the cover glass (which is usually made of a transparent plastic plate as already mentioned in the foregoing), through which perforation, the lamp 5 is inserted and held by means of a grommet 35 so as to directly illuminate the dial plates 11, 21 and the indicator needles 12, 22. The lamp 5 may also be provided in front of the cover glass 4 by being held through an appropriate holding member.

As already stated in the preceding, since the upper steering column cover 75 has a raised section 78 at its upper rear end portion toward the back side of the lamp 5, the mechanical parts such as the lamp 5 per se and the driving power transmission belt 29 of the meters are covered up to avoid any unsightliness.

As stated in the foregoing, since the present invention provides the lamp 5 to directly illuminate the dial plates 11, 21, and the indicator needles 12, 22 in front of the meters, and the back side of the lamp 5 is covered with the raised section 78 of the upper steering handle column cover 75 to constitute the direct illuminating system, the following various advantages would come out.

(1) The illuminating efficiency is good, and the wattage of the lamp can be made smaller than that in the conventional system, or the number of the lamp bulbs can be reduced, which contributes to saving in the power consumption.

(2) Since the lighting of the meter is possible from the middle part thereof, the dial plate as a whole can be illuminated substantially uniformly, so that the meter indication can be read more readily than in the conventional meter lighting system.

(3) Since no lamp accommodating and light diffusing chamber is required to be provided at the back side of the dial plate as in the conventional meter lighting system, the meter case as a whole can be made in a compact size and in a thin thickness.

(4) Replacement of the lamp 5 can be done simply by removing only the upper half of the divided steering column covers 75 and 76.

Thus, the disadvantages inherent in the known type of the automobile meters are totally eliminated, and very effective and appropriate automotibe meter arrangement and illumination therefor are provided by the present invention.

What is claimed is:

1. A meter arrangement for a motor vehicle, which comprises a plurality of meters arranged in the lengthwise direction of the vehicle, said meters having pointers each rotatable about an axis, said pointer axes being closely positioned to be simultaneously readable, spaced drive shafts connected mediately to drive said meters respectively, power transmission means having a driving rotating part directly connected to the drive shaft connected mediately to the one of said meters closest to a driver of the motor vehicle and a rotating driven part laterally offset from said driving rotating part and operatively connected to be driven by said driving part, and a pointer rotating mechanism between said driven part and said pointer and operatively connected to said driven part and to said pointer, to rotate said pointer.

2. The meter arrangement as set forth in claim 1, in which said transmission means comprises a pair of toothed pulleys and a toothed timing belt.

3. The meter arrangement as set forth in claim 1, furtherincluding one or more warning or indicating devices other than said plurality of meters, said devices being accommodated in a casing that is disposed at a position further frontward of said meters and that does not hinder viewing of the pointer needle of said meter nearest the person reading the same.

4. The meter arrangement as set forth in claim 1, further including a steering column cover having an upwardly projecting portion with a viewing window in its rear surface with respect to the travelling direction of the vehicle, and one or more warning or indicating devices accommodated within said upwardly projecting portion for viewing through the window.

5. The meter arrangement as set forth in claim 1, further including a lamp positioned on the viewing side of the meter to directly illuminate dial plates for said meters, and a cover concealing said lamp from being seen from the viewing side of the arrangement.

6. A meter arrangement for a motor vehicle, comprising a pointer rotatable about an axis, a drive shaft connected mediately to said pointer, power transmission means having a driving rotating part directly connected to said drive shaft and a rotating driven part laterally offset from said driving rotating part and operatively connected to be driven by said driving part, and a pointer rotating mechanism between said driven part and said pointer and operatively connected to said driven part and to said pointer, to rotate said pointer.

* * * * *